US010690775B2

(12) United States Patent
Jokinen

(10) Patent No.: US 10,690,775 B2
(45) Date of Patent: Jun. 23, 2020

(54) CROWDSOURCING ATMOSPHERIC CORRECTION DATA

(71) Applicant: NovAtel Inc., Calgary (CA)

(72) Inventor: Altti Jokinen, Calgary (CA)

(73) Assignee: NovAtel Inc., Calgary, AB (CA)

( * ) Notice: Subject to any disclaimer, the term of this patent is extended or adjusted under 35 U.S.C. 154(b) by 456 days.

(21) Appl. No.: 15/637,512

(22) Filed: Jun. 29, 2017

(65) Prior Publication Data
US 2019/0004180 A1    Jan. 3, 2019

(51) Int. Cl.
*G01S 19/07*    (2010.01)
*G01S 19/04*    (2010.01)
*G01S 19/44*    (2010.01)

(52) U.S. Cl.
CPC .............. *G01S 19/07* (2013.01); *G01S 19/04* (2013.01); *G01S 19/44* (2013.01)

(58) Field of Classification Search
CPC .......... G01S 19/07; G01S 19/04; G01S 19/24; G01S 19/14; G01S 19/32; H01Q 1/1257; G01C 15/00
USPC ........................................................ 342/352
See application file for complete search history.

(56) References Cited

U.S. PATENT DOCUMENTS

| 9,354,319 | B2 | 5/2016 | Ferguson et al. | |
| 9,612,340 | B1 | 4/2017 | Miller et al. | |
| 2011/0071926 | A1* | 3/2011 | Wirola | G01S 19/05 705/27.1 |
| 2013/0088384 | A1 | 4/2013 | Syrjarinne et al. | |
| 2013/0147660 | A1* | 6/2013 | Yang | G01S 19/07 342/357.23 |
| 2013/0332072 | A1* | 12/2013 | Janky | G01S 19/07 701/469 |
| 2016/0155338 | A1 | 6/2016 | Lynar et al. | |

(Continued)

OTHER PUBLICATIONS

Deambrogio, Lina, et al., "Impact of High-End Receivers in a Peer-To-Peer Cooperative Localization System," The International Conference on Ubiquitous Positioning, Indoor Navigation and Location-Based Service, UPINLBS 2010, Helsinki (Kirkkonummi), Finland, IEEE, Oct. 14-15, 2010, pp. 1-7.

(Continued)

*Primary Examiner* — Harry K Liu
(74) *Attorney, Agent, or Firm* — Cesari and McKenna, LLP

(57) ABSTRACT

A system and method crowdsources atmospheric data from one or more rovers. The rovers calculate an estimated ionosphere delay value that indicates an adverse effect of ionospheric activity on signals received from the GNSS satellite. The values and identifiers may be transmitted to a server. The server utilizes the received information to generate an ionosphere map that reflects the magnitude of ionospheric delay at different locations. The ionosphere map is transmitted to one or more rovers. The rover determines if a pierce point associated with a selected GNSS satellite in view of the rover falls within the boundaries of the ionosphere map. If so, a corresponding ionosphere delay value is obtained utilizing the ionosphere map and then applied as a correction to account for ionospheric activity. In addition, the central server and/or rover may transmit the estimated ionosphere delay values and identifiers to other rovers.

20 Claims, 7 Drawing Sheets

(56) References Cited

U.S. PATENT DOCUMENTS

2016/0377730 A1* 12/2016 Drescher ................ G01S 19/13
342/357.23
2017/0276793 A1* 9/2017 Memarzadeh .......... G01S 19/07

OTHER PUBLICATIONS

Langley, Richard B., "Innovation: There's an App for That," GPS World, North Coast Media LLC, <http://gpsworld.com/innovation-theres-an-app-for-that/>, Jun. 13, 2016, pp. 1-13.
Pankratius, Victor, et al., "Mobile Crowd Sensing in Space Weather Monitoring: The Mahali Project," Abstract, IEEE Communications Magazine, IEEE Communications Society, < http://ieeexplore.ieee.org/document/6871665/>, IEEE, vol. 52, Issue 8, Aug. 7, 2014, one page.

\* cited by examiner

| Device Identifier | GNSS Satellite Identifier | Pierce Point Location | Device Coordinates | Estimated Ionosphere Delay Value | Standard Deviation of Ionospheric Extimates | Reference Time |
|---|---|---|---|---|---|---|
| Rover A | Satellite A | $x_1, y_1, z_1$ | $x_a, y_a, z_a$ | 26 m | $\sigma_x$ | 19:36:41 UTC |
| Rover B | Satellite A | $x_2, y_2, z_2$ | $x_b, y_b, z_b$ | 4 m | $\sigma_y$ | 20:22:36 UTC |
| Rover B | Satellite B | $x_3, y_3, z_3$ | $x_b, y_b, z_b$ | 0 m | $\sigma_z$ | 3:03:14 UTC |
| Base Station A | Satellite A | | | 12 m | | |
| ... | | | | | | |

FIG. 3

CROWDSOURCING ATMOSPHERIC CORRECTION DATA

BACKGROUND

Technical Field

The invention relates generally to global navigation satellite systems (GNSS), and in particular, to a system that crowdsources atmospheric data from one or more rovers.

Background Information

The ionosphere is a layer of the Earth's atmosphere that is ionized by solar and/or cosmic radiation and typically lies 75-1,000 km (46-621 miles) above the Earth's surface. Specifically, global navigation satellite system (GNSS) satellite signals interact with free electrons along the propagation path through the ionosphere leading to a group delay and phase advance proportional to the Total Electron Content (TEC). These refractive effects cause errors in the observations (e.g., satellite range measurements) corresponding to the signals and result in a degrading of overall position calculation accuracy.

Precise Point Positioning (PPP) is a method that enables worldwide centimeter (cm)-level positioning. Typically, a sparse global network of base stations is used to collect data for generating satellite orbit, clock, code-bias and phase-bias corrections. The corrections are typically generated by a centralized server and then delivered to one or more rovers, for example, by using satellite-based delivery or the Internet. The corrections enable rover receivers to determine cm-level positioning, but the challenge is the long time needed to obtain the desired accuracy, i.e., convergence time. PPP convergence time to 5 centimeters (cm) accuracy may typically be around from 20 to 30 minutes. PPP convergence time may mainly be long due to the time needed to estimate the adverse effects of the ionosphere in a precise way. To improve convergence time, local corrections may be generated utilizing a dense local network of base stations. For example by utilizing local ionospheric corrections, PPP convergence time to 5 centimeters (cm) accuracy may typically be around 1 to 5 minutes. However, a dense network of base stations can be expensive to build and operate.

SUMMARY

The inventive system and method crowdsources atmospheric data, from one or more rovers, that is utilized to account for ionospheric delay. Specifically, each rover, of one or more rovers, receives satellite signals from one or more global navigation satellite system (GNSS) satellites that are in view of the rover. The rover determines to what extent the signals received from a GNSS satellite are being adversely affected by atmospheric conditions, specifically, by ionospheric delay. Specifically, the rover calculates an estimated ionosphere delay value that indicates the adverse effect of ionospheric error on satellite signals transmitted by the GNSS satellite. For example, the estimated ionosphere delay value may be an estimated slant ionosphere delay value. The rover then transmits the ionosphere delay value and other information to a central server. The other information may include, but is not limited to, the coordinates of a pierce point, coordinates of the rover receiver, a standard deviation of the ionosphere delay values, and a reference time at which the estimated ionosphere delay value was calculated. As used herein, the coordinates of a pierce point indicate a location where the satellite signals from the GNSS satellite to the receiver intersect with the ionosphere.

The central server may then utilize the information received from the rovers to generate an ionosphere map that reflects the magnitude of ionospheric delay at different locations. The central server may transmit the ionosphere map to one or more rovers. For example, the central server may transmit the ionosphere map to the rovers at predetermined times (e.g., a schedule) or based on a request from a rover. If the coordinates of the calculated pierce point fall within the boundaries of the ionosphere map, the rover obtains an estimated ionosphere delay value utilizing the ionosphere map and uses the obtained estimated ionosphere delay value as a correction for satellite range measurements obtained from the satellite signals transmitted by the selected GNSS satellite to account for ionospheric activity. Alternatively, the obtained ionosphere delay value may be used as a constraint to ionosphere delay estimated as an Extended Kalman Filter (EKF) state. However, it is expressly contemplated that the estimated ionosphere delay value may be utilized by the rover as a correction in any of a variety of different ways. Advantageously, convergence time is improved to achieve the desired position accuracy at the rover.

In an alternative embodiment, the rovers and/or central server may transmit the estimated ionosphere delay values and other information to one or more rovers. For example, the rovers/central server may transmit the estimated ionosphere delay values and other information to the one or more rovers at predetermined times (e.g., a schedule) or based on a request from a rover. Each rover that received the estimated ionosphere delay values and other information may use a selected estimated ionosphere delay value as a correction for satellite range measurements obtained from the satellite signals transmitted by the selected GNSS satellite in view to account for ionospheric delay or apply the ionosphere delay value as a constraint to ionosphere delay estimated as an Extended Kalman Filter (EKF) state. However, it is expressly contemplated that the estimated ionosphere delay value may be utilized by the rover as a correction in any of a variety of different ways. Again, convergence time is improved to achieve the desired position accuracy at the rover.

BRIEF DESCRIPTION OF THE DRAWINGS

The description below refers to the accompanying drawings, of which:

FIG. 3 illustrates an exemplary table that may store values associated with the operation of the system of FIG. 1;

DETAILED DESCRIPTION OF AN ILLUSTRATIVE EMBODIMENT

Figure 1:
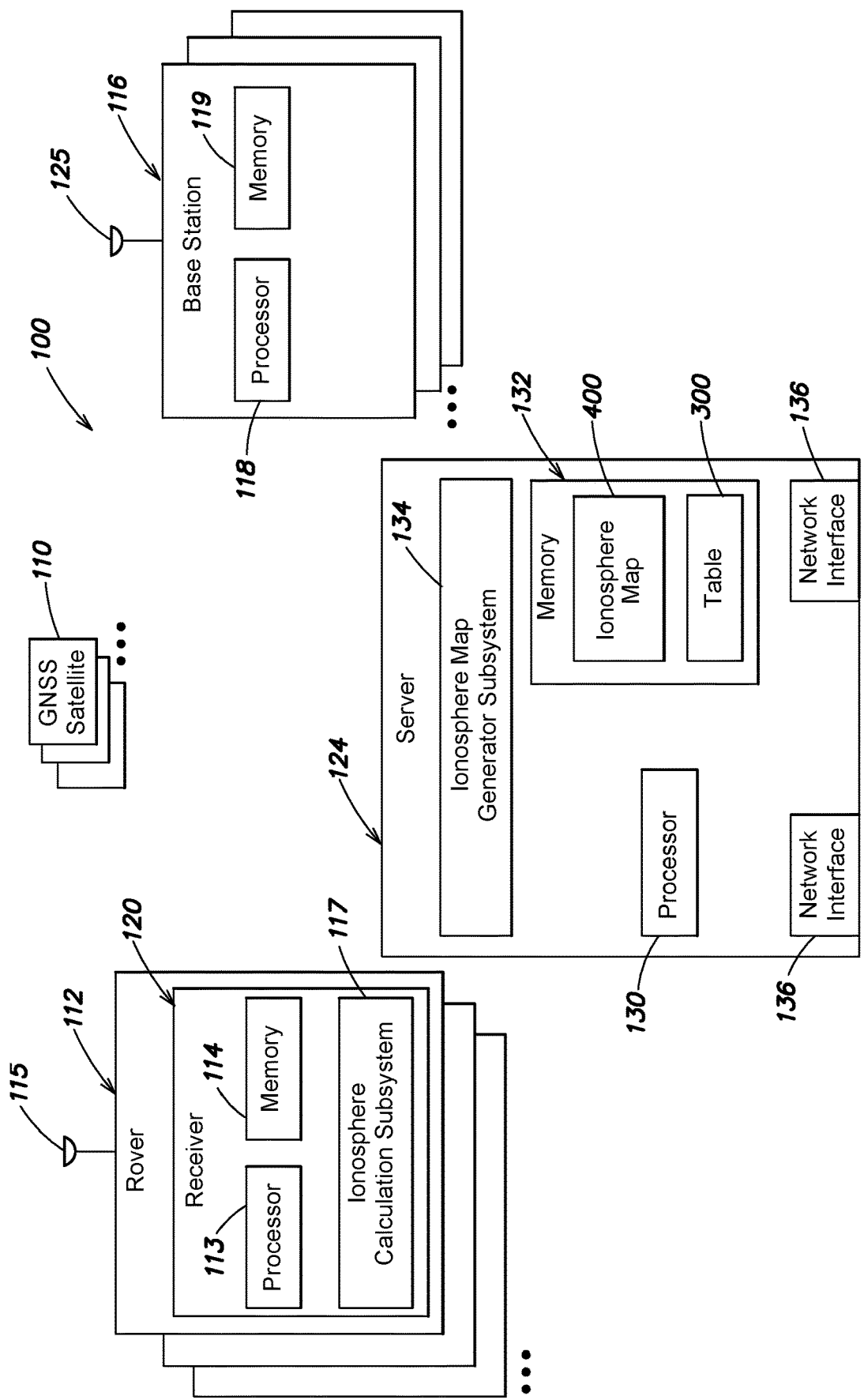
FIG. 1 illustrates a system in accordance with an illustrative embodiment of the invention.

Referring to FIG. 1, a system 100 includes one or more rovers 112, one or more base stations 116, and a central server 124. The rovers 112 and base stations 116 may operate as part of a real time kinematic (RTK) system and/or a Precise Point Positioning (PPP) system over a wired or wireless network (not shown) or satellite-based data delivery (not shown), as known by those skilled in the art.

The one or more base stations 116 are typically stationary, have known positions and essentially clear views of the sky. The base station 116 includes an antenna 125 that receives global navigation satellite system (GNSS) satellite signals from one or more GNSS satellites 110 in view of the base station 116. In addition, the base station 116 includes one or more processors 118 and a memory 119. The one or more processors 118 may operate in a known manner to acquire and track the GNSS satellite signals, make raw observations (e.g., carrier and code-phase (pseudorange) observations), and determine correction information as known by those skilled in the art. Although not necessary, the base station 116 may transmit information, in a known manner, in the form of one or more RTK messages or other type of messages as is known by those skilled in the art. For example, the base station 116 may, in a known manner, provide the raw observations, such as, but not limited to, the code and carrier-phase measurements to the central server 124.

The rover 112 are typically capable of moving and includes an antenna 115 and a GNSS receiver 120 with one or more processors 113, and a memory 114. The GNSS receiver 120 may be a single, dual, or multi-frequency receiver. The one or more processors 113 determine positions based on the timing of codes and carriers in the raw received satellite signals received at the antenna 115, as known by those skilled in the art. The one or more processors 113 execute ionosphere calculation subsystem 117 configured to calculate an estimated ionosphere delay value (e.g., a correction value) incurred by the signals received from a GNSS satellite 110 at the antenna 115 of the rover 112. Specifically, the estimated ionosphere delay may be represented as a numeric value in terms of meters (m) and indicate the delay, incurred by the signals along a path from the GNSS satellite 110 to the rover 112, caused by ionospheric activity. Although FIG. 1 depicts the calculation subsystem 117 being a separate component of the receiver 120, it is expressly contemplated that the calculation subsystem 117 may be part of a PPP engine (not shown) or an RTK engine (not shown) and the calculation subsystem 117 may calculate the estimated ionosphere delay value during the normal operation of the PPP engine and the RTK engine.

The ionosphere calculation subsystem 117 may calculate the estimated ionosphere delay on the satellite signals, for each visible satellite, from one or more satellite signals at one or more frequencies (e.g., L1, L2, and L5) by estimating the ionospheric delay as an Extended Kalman filter (EKF) state, as know by those skilled in the art. However, it is expressly contemplated that any of a variety of techniques may be used to calculate the estimated ionosphere delay, as known by those skilled in the art. The ionosphere calculation subsystem 117 may transmit the estimated ionosphere delay value to one or more other rovers 112 and/or the central server 124, as described in further detail below. For example, the values may be broadcast to the one or more other rovers 112 and/or central server 124, and/or transmitted to the one or more rovers 112 and/or central server 124 utilizing any of a variety of types of messages.

The memory 114 may store the one or more calculated ionosphere delay values and/or one or more received ionosphere delay values received from a different rover 112 and/or the central server 124, as described in further detail below. Further, the memory 114 may store an ionosphere map or other information generated by and received from the central server 124, as described in further detail below.

In addition, the ionosphere calculation subsystem 117 may calculate a pierce point for a selected GNSS satellite. The calculated pierce point may then be compared to the received ionosphere map to determine if the pierce point falls within the boundaries of the ionosphere map. If so, the ionosphere calculation subsystem 117 may obtain an estimated ionosphere delay value utilizing the ionosphere map that is then used to account for ionospheric activity, as described in further detail below.

The central server 124 includes one or more processors 130, a memory 132, and one or more network interfaces 136. The network interfaces 136 contain the mechanical, electrical, and signaling circuitry for communicating with the rovers 112 and base stations 116 over a wired or wireless network (not shown), or satellite-based data delivery (not shown). Specifically, the central server 124 may receive raw observations (e.g., code and carrier phase measurements) from the base station(s) 116 and/or estimated ionosphere delay values from the rover(s) 112.

The one or more processors 130 execute an ionosphere map generator subsystem 134 configured to generate an ionosphere map 400 in accordance with one or more embodiments described herein. In addition, the memory 132 may store a data structure which contains one or more values received from the one or more rovers 112. The data structure may also include estimated ionosphere delay values calculated by the processor 130 that are based on the raw observations received from the one or more base stations 116. For example, the data structure may be a table 300. It is noted that the data structure being implemented as a table 300 is for illustratively purposes only, and that the data structure may be any of a variety of data structures as known by those skilled in the art. In addition or alternatively, the table 300 may be stored in storage (not shown) that is coupled to and external to the central server 124. The storage coupled to and external to the central server 124 may be, but is not limited to, storage device such as hard disk drives (HDDs), and/or storage devices such as solid state drives (SSDs). The central server 124 may transmit the one or more values received from the rovers 112 and stored in the table 300 to one or more other rovers 112, as described in further detail below. For example, the values may be broadcast to the one or more other rovers 112 and/or transmitted to the one or more rovers 112 utilizing any of a variety of types of messages.

In addition, the ionosphere map generator subsystem 134 may utilize the values stored in the table 300 to generate the ionosphere map 400, as described in further detail below. In addition, the ionosphere map 400 may be transmitted from the central server 124 to one or more rovers 112. For example, the ionosphere map 400 may be broadcast to the one or more rovers 112 and/or transmitted to the one or more rovers 112 utilizing any of a variety of types of messages.

Figure 2:
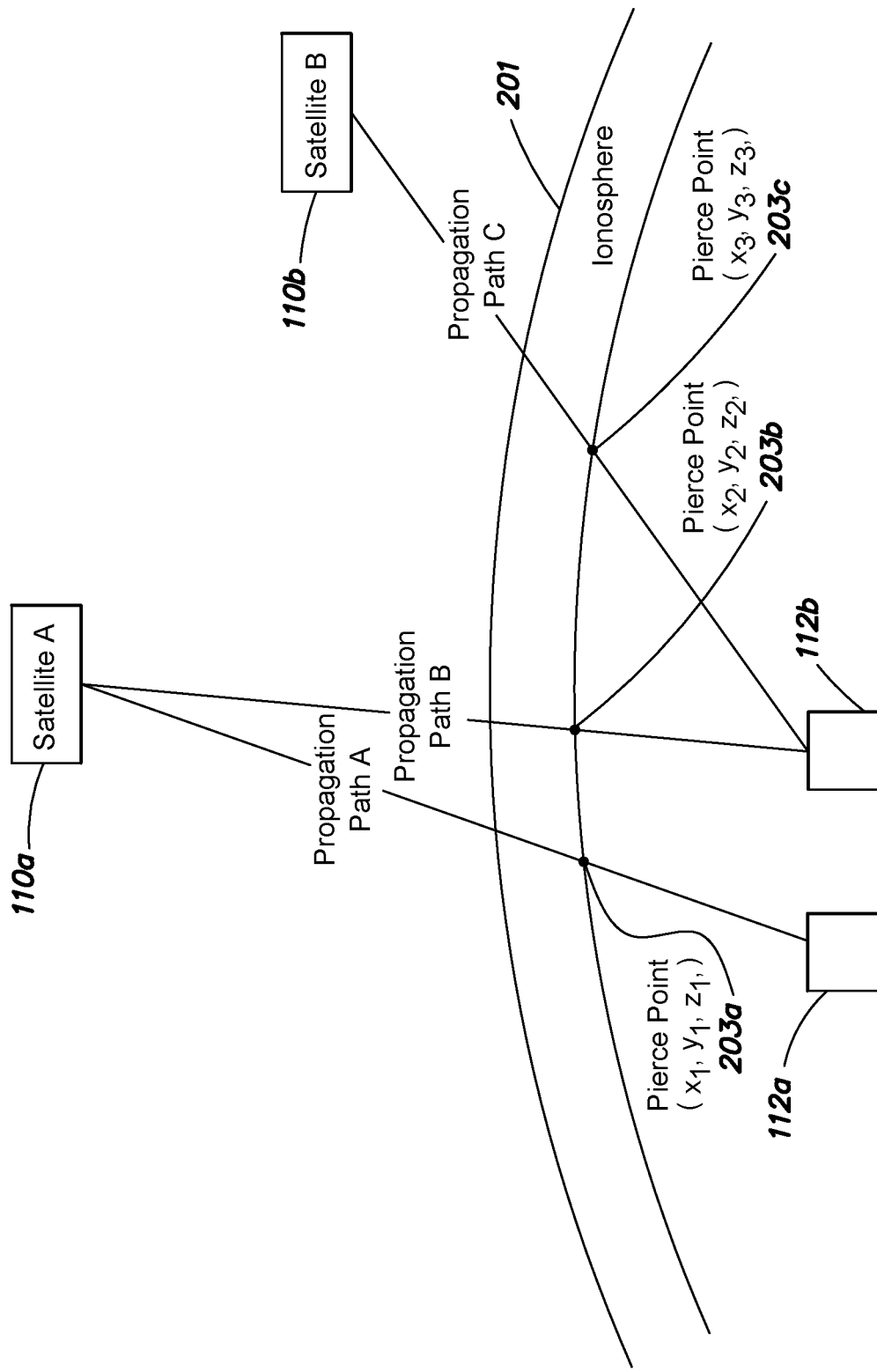
FIG. 2 illustrates an exemplary environment in which the system of FIG. 1 may operate.

FIG. 2 shows an environment in which the system of FIG. 1 may operate. As depicted in FIG. 2, a GNSS satellite 110a (hereinafter "Satellite A") is in view of rovers 112a and 112b while a GNSS satellite 110b (hereinafter "Satellite B") is in view of rover 112b, wherein receiver 120 of rover 112a has coordinates $x_a$, $y_a$, and $z_a$ and receiver 120 of rover 112b has coordinates $x_b$, $y_b$, and $z_b$. In the example as depicted in FIG. 2, Satellite B is not in view of rover 112a. The signals for the Satellites A and B are indicated by the lines labeled as propagation paths A, B, and C in FIG. 2. The satellite signals transmitted by the Satellite A and received by the rovers 112a and 112b are adversely affected by ionospheric activity while the signals transmitted by the Satellite B and received by the rover 112b are not adversely affected by ionospheric activity.

Specifically, ionospheric activity subjects the GNSS signals from Satellite A to the respective rovers 112a and 112b to a delay. As such, the ionospheric activity causes errors in the observations (e.g., satellite range measurement) which, if uncorrected, degrade overall positioning accuracy.

In operation, each of the rovers 112a and 112b calculate the estimated ionosphere delay based on the satellite signals received from a GNSS satellite to determine the adverse effect of ionospheric activity on satellite signals. The estimated ionosphere delay value indicates the delay caused by ionospheric activity on satellite signal reaching the rover 112, and thus indicates the adverse effect of ionospheric activity on the satellite signals. Specifically, as the estimated ionosphere delay value increases, it indicates that the adverse effect of ionospheric activity on the signals from the GNSS satellite to the rover 112 is getting stronger. In addition, and in a known manner, the rovers 112a and 112b may calculate the coordinates of a pierce point (e.g., x, y, and/or z coordinates where the satellite signals of a particular GNSS satellite to the rover intersects with the ionosphere) for each GNSS satellite in view of the rover 112. Further, the rovers 112a and 112b may calculate a standard deviation of the estimated ionosphere delay values, in a known manner. In addition, rovers 112a and 112b may determine a reference time at which the estimated ionosphere delay value was calculated.

Based on the example as depicted in FIG. 2, the ionosphere calculation subsystem 117 of rover 112a calculates the estimated ionosphere delay value to be 26 m based on satellite signals received from Satellite A. As described above, the rover 112a may calculate the estimated ionosphere delay value using any of a variety of techniques, as known by those skilled in the art. The estimated ionosphere delay value of 26 m may indicate, for example, that the adverse effect of ionospheric activity on the signals from Satellite A to rover 112a is strong. In addition, the ionosphere calculation subsystem 117 of rover 112a calculates the coordinates for pierce point 203a, where the coordinates indicate where the satellite signals (indicated by propagation path A) from Satellite A intersect with the ionosphere 201. Specifically, ionosphere calculation subsystem 117 of rover 112a calculates coordinates for pierce point 203a to be $x_1$, $y_1$, and $z_1$. In addition, the ionosphere calculation subsystem 117 of rover 112a may calculate a standard deviation of estimated ionosphere delay values as $\sigma_x$. Further, the ionosphere calculation subsystem 117 of rover 112a determines that the estimated ionosphere delay value was calculated at 19:36:41 UTC.

Further and based on the example as depicted in FIG. 2, the ionosphere calculation subsystem 117 of rover 112b calculates the estimated ionosphere delay value to be 4 m based on satellite signals received from Satellite A. As described above, the rover 112b may calculate the estimated ionosphere delay value using any of a variety of techniques, as known by those skilled in the art. The estimated ionosphere delay value of 4 m may indicate, for example, that the adverse effect of ionospheric activity on the signals from Satellite A to rover 112b is present but not strong (i.e., weak). Further, and in a known manner, the ionosphere calculation subsystem 117 of rover 112b calculates the coordinates for pierce point 203b to be the $x_2$, $y_2$, and $z_2$. In addition, the ionosphere calculation subsystem 117 of rover 112b may calculate a standard deviation of estimated ionosphere delay values as $\sigma_y$. Further, the ionosphere calculation subsystem 117 of rover 112b determines that the estimated ionosphere delay value was calculated at 20:22:36 UTC.

In addition and based on the example as depicted in FIG. 2, the ionosphere calculation subsystem 117 of rover 112b calculates the estimated ionosphere delay value to be 0 m, or a nominal value (e.g., 0.03 m) based on satellite signals received from Satellite B. The estimated ionosphere delay value of 0 m may indicate, for example, that there is no or negligible adverse effect of ionospheric activity on the signals from Satellite B to rover 112b. In addition, and in a known manner, the ionosphere calculation subsystem 117 calculates the coordinates for pierce point 203c to be $x_3$, $y_3$, and $z_3$. Further, the ionosphere calculation subsystem 117 of rover 112b may calculate a standard deviation of estimated ionosphere delay values as $\sigma_z$. In addition, the ionosphere calculation subsystem 117 of rover 112b determines that the estimated ionosphere delay value was calculated at 3:03:14 UTC.

Although FIG. 2 depicts Satellite A being in view of rovers 112a and 112b and Satellite B being in view of only rover 112b, it is expressly contemplated that any number of GNSS satellites may be in view of each rover, for example, due to the movement of the rovers, and the rovers may calculate the estimated ionosphere delay for each of the GNSS satellites in view of the rovers, in a similar manner as described herein.

The rovers 112a and 112b may then transmit one or more calculated values and identifiers to the central server 124 for inclusion in, for example, the table 300. Specifically, the values and identifiers transmitted from rovers 112a and 112b to the central server 124, may include, but are not limited to, a device identifier of the rover, a GNSS satellite identifier, a pierce point location (e.g., coordinates values), coordinates of the rover, an estimated ionosphere delay value, and a standard deviation. For example, rovers 112a and 112b may broadcast the values and identifiers to the central server 124.

FIG. 3 depicts an exemplary data structure such as a table 300 that may be used to store the particular values and identifiers transmitted from the rovers 112 to the central server 124. The table 300 may be stored in the memory 132 of the central server 124 and/or storage (not shown) coupled to the central server 124. It should be noted that the use of a table is for illustrative purposes, and in alternative embodiments a different data container or structure may be utilized. The table 300 may include a device identifier column 302, a GNSS satellite identifier column 304, a pierce point location column 306, a device coordinates column 308, an estimated ionosphere delay value column 310, a standard deviation of ionosphere estimates column 312, and a reference time column 314.

The device identifier column 302 may store an identifier that uniquely identifies a rover or a base station. The GNSS satellite identifier column 304 may store an identifier that uniquely identifies a GNSS satellite. The pierce point location column 306 may store the x, y, and/or z coordinates calculated for a pierce point, the device coordinates column 308 may store the coordinates of the rover 112 or the base station 116. The estimated ionosphere delay value column 308 may store an estimated ionosphere delay value calculated by the rover 112 or the central server 124. The standard deviation of ionosphere estimates column 312 may store a standard deviation value of ionosphere estimates, and the reference time column 314 may store a reference time at which a rover 112 calculated the estimated ionosphere delay value.

For example, the table 300 may store the values determined and calculated as described above in reference to the example in FIG. 2. Specifically, the device identifier column 302 may store a rover identifier of "Rover A" for rover 112a. In addition, and in a corresponding row entry, the GNSS satellite identifier column 304 may store a GNSS identifier of "GNSS A" for GNSS satellite 110a. Further, in another corresponding row entry, the pierce point location column 306 may store $x_1$, $y_1$, and $z_1$ coordinates for pierce points 203a. In another corresponding row entry, the device coordinates column 308 may store $x_a$, $y_a$, and $z_a$ for the coordinates of rover 112a. In another corresponding row entry, the calculated estimated ionosphere delay value column 310 may store the estimated ionosphere delay value of 26 m calculated by rover 112a indicating the delay caused by ionospheric activity on the signals from the GNSS satellite 110a to rover 112a. Further, in another corresponding row entry, the standard deviation of ionosphere estimates column 312 may store $\sigma_x$ indicating the calculated standard deviation for the estimated ionosphere delay values. Finally, in another corresponding row entry, the reference time column 314 may store 19:36:41 UTC indicating the reference time at which rover 112a calculated the estimated ionosphere delay value.

In a different row, the device identifier column 302 may store a rover identifier of "Rover B" for rover 112b. In addition, and in a corresponding row entry, the GNSS satellite identifier column 304 may store a GNSS identifier of "GNSS A" for GNSS satellite 110a. Further, in another corresponding row entry, the pierce point location column 306 may store $x_2$, $y_2$, and $z_2$ coordinates for pierce points 203b. In another corresponding row entry, the device coordinates column 308 may store $x_b$, $y_b$, and $z_b$ for the coordinates of rover 112b. In another corresponding row entry, the estimated ionosphere delay value column 308 may store the estimated ionosphere delay value of 4 m calculated by rover 112b indicating the delay caused by ionospheric activity on the signals from the GNSS satellite 110a to rover 112b. Further, in another corresponding row entry, the standard deviation of ionosphere estimates column 312 may store $\sigma_y$ indicating the calculated standard deviation for the estimated ionosphere delay values. Finally, in another corresponding row entry, the reference time column 314 may store 20:22:36 UTC indicating the reference time at which rover 112b calculated the estimated ionosphere delay value. Similarly and in another different row, the device identifier column 302 may store a rover identifier of "Rover B" for rover 112b. In addition, and in a corresponding row entry, the GNSS satellite identifier column 304 may store a GNSS identifier of "GNSS B" for GNSS satellite 110b. Further, in another corresponding row entry, the pierce point location column 306 may store $x_3$, $y_3$, and $z_3$ coordinates for pierce points 203c. In another corresponding row entry, the device coordinates column 308 may store $x_b$, $y_b$, and $z_b$ for the coordinates of rover 112b. In another corresponding row entry, the estimated ionosphere delay value column 308 may store the estimated ionosphere delay value of 0 m calculated by rover 112b indicate the delay caused by ionospheric activity on the signals from GNSS satellite 110b to rover 112b. Finally, in another corresponding row entry, the standard deviation of ionosphere estimates column 312 may store a value representing a calculated standard deviation for the estimated ionosphere delay values as $\sigma_z$. Finally, in another corresponding row entry, the reference time column 314 may store 3:03:14 UTC indicating the reference time at which rover 112b calculated the estimated ionosphere delay value.

Thus, and as more rovers 112 provide estimated ionosphere delay values and information to the central server 124, the central server 124 may store those values in the table 300 to more accurately determine the magnitude of ionospheric activity.

In addition, the table 300 may store similar values based on the raw observations received from the one or more base stations 116. For example, base station 116a (not shown) may produce raw observations for GNSS satellite 110a. The base station 116a may then transmit base station identifier of "Base Station A", the raw observations, the GNSS satellite identifier of "GNSS A" to the central server. The central server may then, in a known manner, calculate a corresponding ionosphere delay value of 12 m based on the raw observations received from base station 116a. The central server may then store the calculated ionosphere delay value and the other information in a corresponding row of the table 300 in a similar manner as described above and as depicted in table 300.

It is noted that the values stored in the table 300 are for illustrative purposes and other and/or differing values may be stored in the table 300. For example, although reference is made to rover 112a calculating an estimated ionosphere delay value for Satellite A, it expressly contemplated that rover 112a may calculate an estimated ionosphere delay value for one or more other GNSS satellites 110 in view of rover 112a as the rover 112a moves, for example, to be stored in the table 300.

Figure 4:
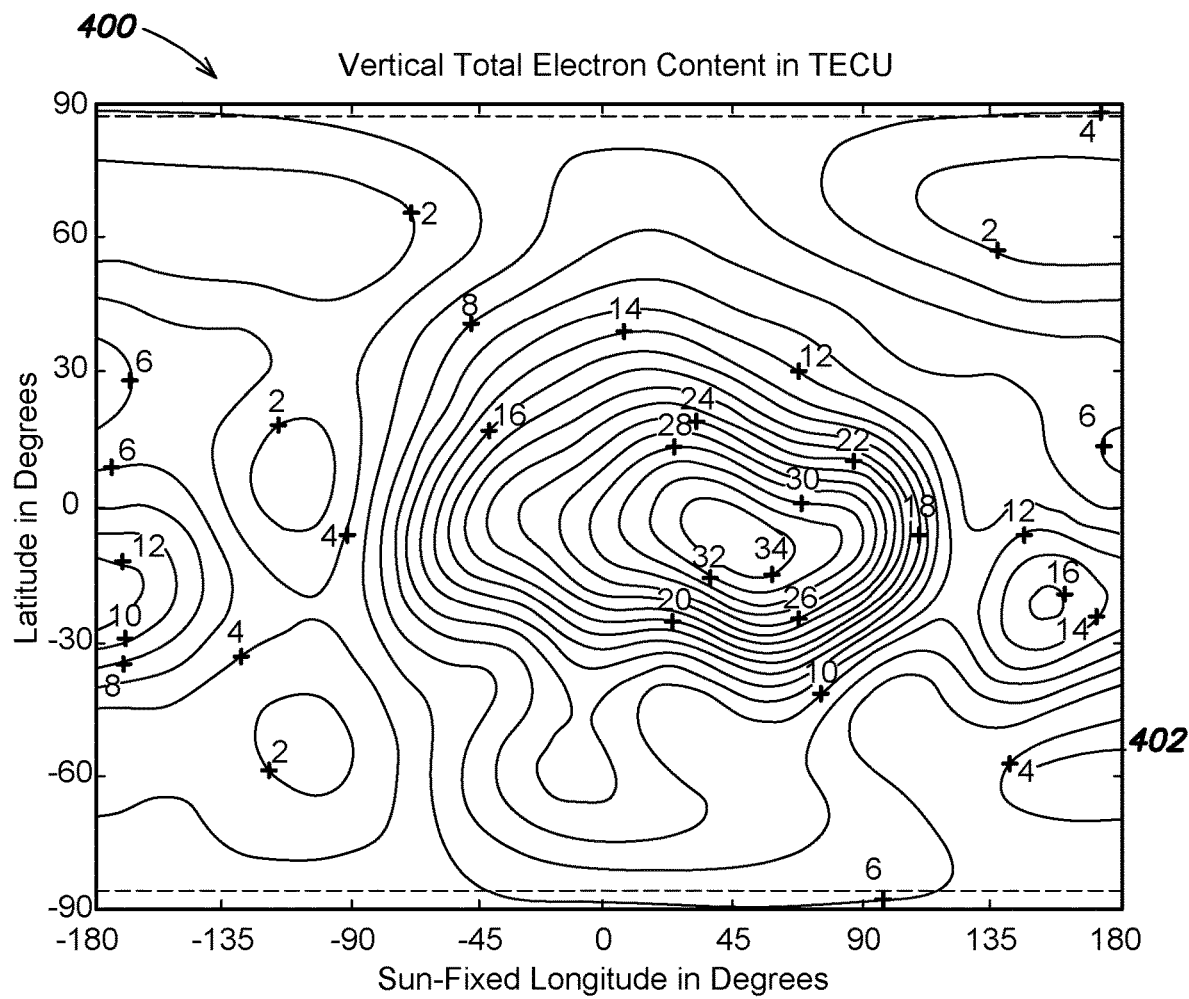
FIG. 4 illustrates an exemplary ionosphere map associated with the operation of the system of FIG. 1.

FIG. 4 is an exemplary ionosphere map 400 generated in accordance with one or more embodiments described herein. Specifically, the processor 130 of the central server 124 executes the ionosphere map generator subsystem 134 to utilize the values stored in the table 300 to generate the ionosphere map 400 indicating the magnitude of ionospheric delay at different locations.

For example, the ionosphere map 400 as depicted in FIG. 4 may be divided into 5 degree latitude and sun-fixed longitude cells. Each cell within the ionosphere map has Vertical Total Electron Content (VTEC) value 402 (in TEC unit) that reflects the magnitude of ionospheric delay at different locations. Specifically, the received ionosphere delay values may be converted to VTEC values in a known manner. The VTEC values may then be placed at particular locations on the ionosphere map 400 based on the pierce points calculated by the rovers 112 and the coordinates of the rover 112, as known by those skilled in the art. In addition, it is expressly contemplated that the ionosphere delay values, calculated by the central server 124 utilizing the raw observations received from the base stations 116, may also be converted to VTEC values, in a known manner. As such, and as depicted in ionosphere map, the VTEC values at different locations, that are based on the received ionosphere delay values, reflect the magnitude of ionospheric delay at the different locations at specified reference times.

In an embodiment, the central server 124 may then transmit the ionosphere map 400 to one or more rovers 112. Specifically, the central server may transmit the ionosphere map to the one or more rovers 112 at predetermined times (e.g., a schedule) or based on a request from a rover. For example, the one or more rovers 112 that receive the ionosphere map 400 may include a single frequency receiver and unable to calculate an estimated ionosphere delay value in accurate way.

Each rover 112 may utilize the received ionosphere map 400 to determine if a pierce point calculated by the rover for a given GNSS satellite in view of the rover 112 falls within the boundaries of the ionosphere map 400. The ionosphere calculation subsystem 117 may then select a cell within the ionosphere map based on the coordinates of the pierce point. Thereafter, the ionosphere calculation subsystem 117 may calculate, in a known manner, a corresponding ionosphere delay value based on the VTEC value within the cell. The corresponding ionosphere delay value calculated based on the received ionosphere map may then be used to correct satellite range measurements or the ionosphere delay value can be applied as a constraint to ionosphere delay estimated as an EKF state.

Although the ionosphere map 400 in FIG. 4 is depicted as a grid, it is expressly contemplated that the ionosphere map 400 may have any kind of format that depicts ionosphere activity based on at least the ionosphere delay values received from the rovers 112. The ionosphere map may, for example, depict the ionosphere as a single or multiple-layer model.

In addition, the ionosphere map 400 may be satellite specific and may represent ionosphere activity for one or more satellites in a particular geographical location/region (e.g., continent, country or state). For example, the ionosphere map 400 may further include satellite specific information (not shown), such as an identifier of a GNSS satellite, indicating which satellites are associated with the ionosphere map 400. The rover 112 that receives the ionosphere map 400 may determine if a satellite in view of the rover 112 is included in the ionosphere map 400. If the satellite in view of the rover 112 is included in the ionosphere map 400, the rover may determine the ionosphere map 400 is valid and then obtain an estimated ionosphere delay value in a similar manner as described above.

Figure 5:
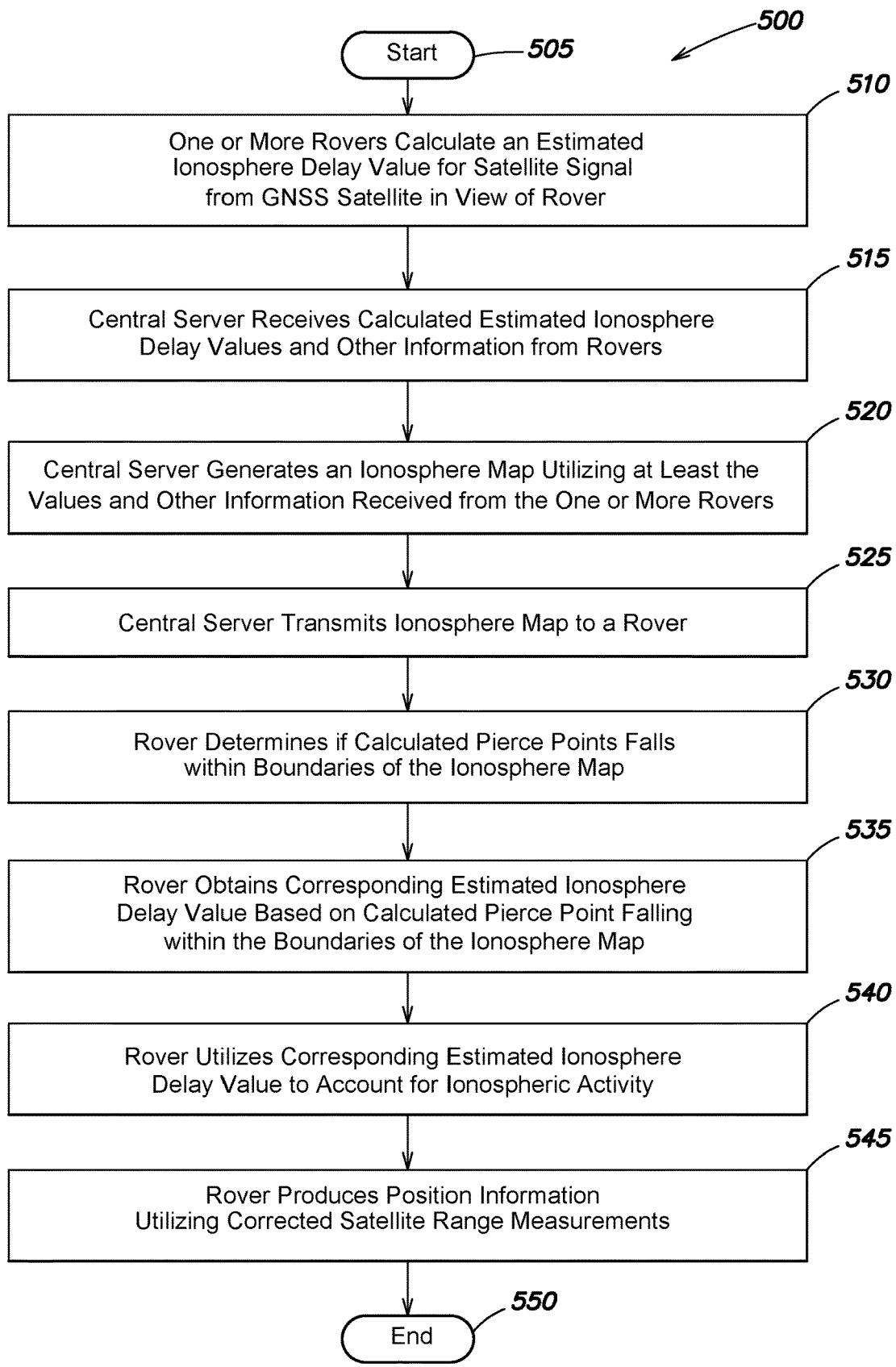
FIG. 5 is an exemplary flow chart for the operation of the systems of FIG. 1.

FIG. 5 is an exemplary flow chart of the operation of the system and method for crowdsourcing atmospheric correction data to generate and utilize an ionosphere map to account for ionospheric activity. The procedure 500 starts at step 505 and continues to step 510, where one or more rovers calculate one or more estimated ionosphere delay values for satellite signals from GNSS satellites in view of the rover. Specifically, the ionospheric calculation subsystem 117 of the rover 112 calculates an estimated ionosphere delay value that, for example, is a numerical value in terms of meters and indicates the delay on the signals from the GNSS satellites caused by ionospheric activity. As described above, the rover may determine the estimated ionosphere delay value using any of a variety of techniques, as known by those skilled in the art.

The procedure continues to step 515 where a central server receives the calculated estimated ionosphere delay values and other information from the one or more rovers. The other information may include, but is not limited to, a device identifier that uniquely identifies the rover, a unique identifier for the GNSS satellite in view of the rover, coordinates for the pierce point associated with the GNSS satellite in view of the rover, coordinates of the rover, a standard deviation of estimated ionosphere delay values, and a reference time at which the estimated ionosphere delay value was calculate. The values and other information may be stored in table 300. It is noted that the table 300 may further store ionosphere delay values calculated by the central server and based on raw observation produced by one or more base stations and other information, as described above.

The procedure continues to step 520 where the central server generates an ionosphere map utilizing at least the values and other information received from the one or more rovers. For example, the ionosphere map generator subsystem 134 generates ionosphere map 400 that includes VTEC values within cells of the ionosphere map 400.

The procedure continues to step 525 where the central server transmits the ionosphere map to a rover. For example, the central server 124 broadcasts the ionosphere map 400 to the rover 112 at a predetermined time (e.g., schedule) or based on a request from the rover. The rover 112 that received the ionosphere map 400 may be include a single frequency receiver and unable to calculate an estimated ionosphere delay value in an accurate way. Alternatively, the receiver 120 of the rover 112 that received the ionosphere map 400 may be a dual or multiple-frequency receiver that is able to estimate ionosphere corrections but would require longer PPP convergence time without using ionosphere corrections.

The procedure continues to step 530 where the rover 112 that received the ionosphere map determines if a calculated pierce point falls within the boundaries of the ionosphere map. At step 535, the rover that received the ionosphere map obtains a corresponding estimated ionosphere delay value based on the calculated pierce point falling within the boundaries of the received ionosphere map 400. Specifically, the location of the pierce point determines which VTEC value is selected from the ionosphere map 400. Thereafter, the ionosphere calculation subsystem 117 may calculate, in a known manner, a corresponding ionosphere delay value based on the selected VTEC value from the ionosphere map 400.

The procedure continues to step 540 where the rover utilizes the corresponding estimated ionosphere delay value to account for ionospheric activity. Specifically, the ionosphere calculation subsystem 117 uses the obtained estimated ionosphere delay value as a correction, in a known manner, for the satellite range measurements to account for ionospheric activity and to produce corrected satellite range measurements. For example, if the obtained ionosphere delay value is 10 m the rover 112 uses 10 m as a correction for the satellite range measurements obtained from the satellite signals transmitted by a given GNSS satellite to account for ionospheric activity. Alternatively, the corresponding ionosphere delay value may be applied as a constraint to ionosphere delay estimated as an EKF state. However, it is expressly contemplated that the estimated ionosphere delay value may be utilized by the rover as a correction in any of a variety of different ways.

At step 545, the rover produces position information utilizing the corrected satellite range measurements. Advantageously, convergence time is improved to achieve the desired position accuracy at the rover. At step 550, the procedure ends.

In an alternative embodiment, the central server 124 and/or one or more rovers 112 may transmit the values and identifiers to a particular rover 112. For example, the rovers 112 may exist in a Peer-to-Peer (P2P) environment such that the rovers 112 communicate and transmit the one or more values and identifiers between each other in the P2P environment. In addition or alternatively, the values and identifiers may be broadcast from the central server 124 to the particular rover 112 and/or transmitted to the particular rover 112 utilizing any of a variety of types of messages.

The ionosphere calculation subsystem 117 of the rover 112 that receives the values and identifiers may then use a selected estimated ionosphere delay value as a correction for the satellite range measurements obtained from the signals transmitted by the given satellite to account for ionospheric activity. Advantageously, convergence time is improved to achieve the desired position accuracy at the rover.

Figure 6:
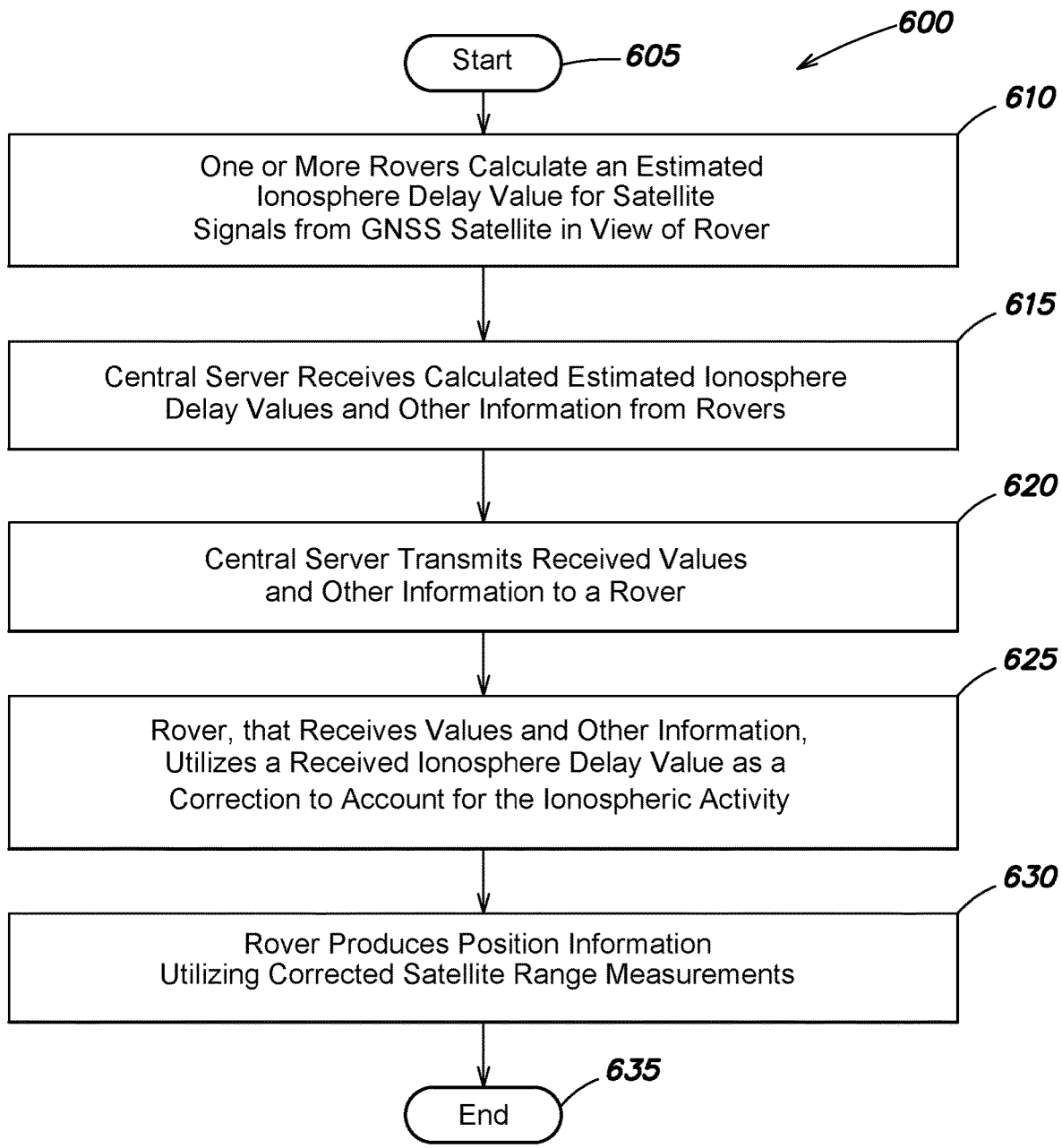
FIG. 6 is an exemplary flow chart for the operation of the systems of FIG. 1.

FIG. 6 is an exemplary flow chart of the operation of the system and method for crowdsourcing atmospheric correction data to transmit information from a central server to a rover to account for ionospheric activity. The procedure 600 starts at step 605 and continues to step 610, where one or more rovers calculate one or more estimated ionosphere delay values for satellite signals from GNSS satellites in view of the rover. Specifically, the ionospheric calculation subsystem 117 of the rover 112 calculates an estimated ionosphere delay value that, for example, is a numerical value in terms of meters and indicates the delay on the signals from the GNSS satellites caused by ionospheric activity. As described above, the rover may determine the estimated ionosphere delay value using any of a variety of techniques, as known by those skilled in the art.

The procedure continues to step 615 where a central server receives the estimated ionosphere delay values and other information from the one or more rovers. The other information may include, but is not limited to, a device identifier that uniquely identifies the rover, a unique identifier for the GNSS satellite in view of the rover, coordinates for the pierce point associated with the GNSS satellite in view of the rover, the coordinates of the rover, the standard deviation of ionospheric estimates, and a reference time. The received values and other information may be stored in table 300. It is noted that the table 300 may further store ionosphere delay values calculated by the central server and based on raw observation produced by one or more base stations and other information, as described above.

The procedure continues to step 620 where the central server transmits the received values and other information to a rover. For example, the central server 124 broadcasts the received values and other information to the rover 112 at a predetermined time (e.g., schedule) or based on a request from the rover. The rover 112 that received the values and other information may include a single frequency receiver and unable to calculate an estimated ionosphere delay value in an accurate way. Alternatively, the receiver 120 of the rover 112 that received the ionosphere map 400 may be a dual or multiple-frequency receiver that is able to estimate ionosphere corrections but would require longer PPP convergence time without using ionosphere corrections.

The procedure continues to step 625 where the rover, that received the values and other information, utilizes a received ionosphere delay value as a correction to account for the ionospheric activity. The ionosphere delay value may be applied as a correction to satellite range measurements or alternatively as a constraint to ionosphere delay estimated as an EKF state. However, it is expressly contemplated that the estimated ionosphere delay value may be utilized by the rover as a correction in any of a variety of different ways.

For example, and with reference to table 300, if the selected estimated ionosphere delay value is 26 m, the rover 112 uses 26 m as a correction for the satellite range measurements obtained from the satellite signals transmitted by Satellite A to account for ionospheric activity and produce corrected satellite range measurements.

If, for example, the rover receives two different estimated ionosphere delay values associated with the same GNSS satellite, the rover may select a particular estimated ionosphere delay value based on the received device coordinates and/or received standard deviation values. For example, and with reference to FIG. 3, if the rover that receives the values has to choose between 26 m and 4 m, the rover may compare its computed coordinates with the coordinates of Rover A ($x_a$, $y_a$, and $z_a$) and Rover B ($x_b$, $y_b$, and $z_b$). The rover may choose 26 m if its coordinates are closer to the coordinates of Rover A and choose 4 m if its coordinates are closer to the coordinates of Rover B. Alternatively, interpolation may be utilized to use both of the estimated ionosphere delay values received from Rover A and Rover B, as is known by those skilled in the art.

In a further embodiment, the rover that receives the values may choose the estimated ionosphere delay value that has a corresponding standard deviation value that is smaller. That is, the standard deviation value may be indicative of the reliability of the corresponding estimated ionosphere delay value wherein an estimated ionosphere delay associated with a larger standard deviation value may be less reliable than an estimated ionosphere delay value associated with a smaller standard deviation value. For example, the rover may choose 26 m if $\sigma_x$ is less than $\sigma_y$, and may choose 4 m if $\sigma_y$ is less than $\sigma_x$. That is, the estimated ionosphere delay values may be weighted utilizing the standard deviation values where an estimated ionosphere delay value associated with a smaller standard deviation value is prioritized over an estimated ionosphere delay value associated with a larger standard deviation value. In an even further embodiment, the rover coordinates and standard deviation value may be utilized together to weight the received estimated ionosphere delay values.

At step 630, the rover produces position information utilizing the corrected satellite range measurements. At step 635, the procedure ends.

Figure 7:
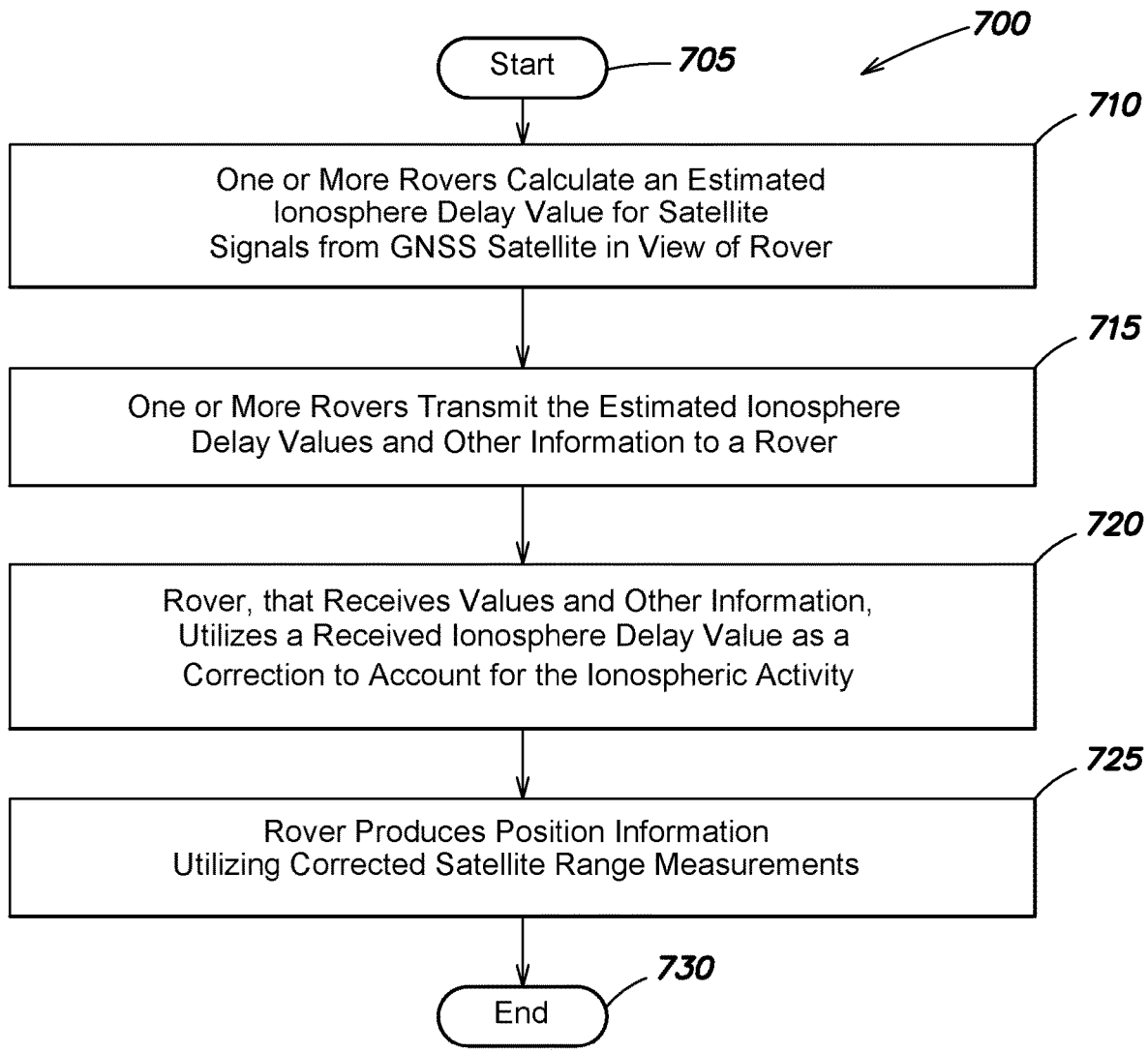
FIG. 7 is an exemplary flow chart for the operation of the systems of FIG. 1.

FIG. 7 is an exemplary flow chart of the operation of the system and method for crowdsourcing atmospheric correction data to transmit information between rovers to account for ionospheric activity. The procedure 700 starts at step 705 and continues to step 710, where one or more rovers calculate one or more estimated ionosphere delay values for satellite signals from GNSS satellites in view of the rover. Specifically, the ionospheric calculation subsystem 117 of the rover 112 calculates an estimated ionosphere delay value that, for example, is a numerical value in terms of meters and indicates the delay on the signals from the GNSS satellites caused by ionospheric activity. As described above, the rover may determine the estimated ionosphere delay value using any of a variety of techniques, as known by those skilled in the art.

The procedure continues to step 715 where the one or more rovers transmit the estimated ionosphere delay values and other information to a rover. The other information may include, but is not limited to, a device identifier that uniquely identifies the rover, a unique identifier for the GNSS satellite in view of the rover, coordinates for the pierce point associated with the GNSS satellite in view of the rover, coordinates of the rover, a standard deviation of estimated ionosphere delay values, and a reference time. For example, the one or more rovers transmit the received values and other information to the rover 112 at a predetermined time (e.g., schedule) or based on a request from the rover over a P2P network. The rover 112 that received the values and other information may include a single frequency receiver and unable to calculate an estimated ionosphere delay value. Alternatively, the receiver 120 of the rover 112 that received the ionosphere map 400 may be a dual or multiple-frequency receiver that is able to estimate ionosphere corrections but would require longer PPP convergence time without using ionosphere corrections.

The procedure continues to step 720 where the rover, that received the values and other information, utilizes a received ionosphere delay value as a correction to account for the ionospheric activity. For example, the rover 112 receives an ionosphere delay value for Satellite A that is in view of the rover 112. The ionosphere delay value may be applied as a correction to satellite range measurements or alternatively as a constraint to ionosphere delay estimated as an EKF state. However, it is expressly contemplated that the estimated ionosphere delay value may be utilized by the rover as a correction in any of a variety of different ways.

If, for example, the receive receives multiple estimated ionosphere delay values for the same satellite, the receiver may select a particular ionosphere delay value based on the rover coordinates and/or the standard deviation in the manner described above with reference to FIG. 6. At step 725, the rover produces position information utilizing the corrected satellite range measurements. At step 730, the procedure ends.

The foregoing description described certain example embodiments. It will be apparent, however, that other variations and modifications may be made to the described embodiments, with the attainment of some or all of their advantages. For example, although reference is made to crowdsourcing atmospheric data to account for ionospheric activity, it is expressly contemplated that the embodiments described herein may crowdsource atmospheric data to account for tropospheric activity. Specifically, atmospheric data associated with the troposphere may be crowdsourced from one or more rovers and the central server may generate a troposphere map that is then utilized by a rover to account for tropospheric activity, in a similar manner as described above. In addition or alternatively, other information (e.g., multipath estimates, interference estimates, ephemeris information) obtained by the rover may be crowdsourced and provided to the central server and/or other rovers in the manner described above. In addition or alternatively, the central server and/or rovers may send the tropospheric delay values to account for tropospheric activity, in a similar manner as described above. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system, comprising:
    a processor and a memory, the processor configured to:
        receive, from at least one rover, one or more estimated ionosphere delay values where each estimated ionosphere delay value is calculated for a corresponding global navigation satellite system (GNSS) satellite in view of the rover, and wherein each of the one or more estimated ionosphere delay values indicates an adverse effect of ionospheric activity on satellite signals transmitted by the corresponding GNSS satellite,
        receive, from the at least one rover, coordinates of one or more pierce points and coordinates of the rover, wherein the coordinates of each pierce point indicate an intersecting location of the satellite signals transmitted by the corresponding GNSS satellite and the ionosphere, and
        generate an ionosphere map that reflects the ionospheric activity for a geographical location or region, wherein the ionosphere map is generated utilizing the one or more estimated ionosphere delay values, the coordinates of the one or more pierce points received from the at least one rover, and the coordinates of the rover received from the at least one rover.

2. The system of claim 1, wherein the processor is further configured to receive, from the at least one rover, an identifier that uniquely identifies the rover and an identifier that uniquely identifies the corresponding GNSS satellite.

3. The system of claim 2, wherein a table is stored in the memory, wherein an entry of the table is configured to store each of the one of more estimated ionosphere delay values calculated for the corresponding GNSS satellite, the coordinates of the pierce point associated with the corresponding GNSS satellite, the identifier that uniquely identifies the rover, the coordinates of the rover, the identifier that uniquely identifies the corresponding GNSS satellite, a standard deviation of estimated ionosphere delay values, and a reference time at which the estimated ionosphere delay value was calculated.

4. The system of claim 1, wherein as the one or more estimated ionosphere delay values increase, the processor is further configured to determine that the adverse effect of the ionospheric activity on the satellite signals is getting stronger.

5. The system of claim 1 wherein the processor is further configured to transmit the ionosphere map to one or more rovers, wherein each rover of the one or more rovers obtains a corresponding estimated ionosphere delay value as a correction for satellite range measurement utilizing the received ionosphere map.

6. The system of claim 5 wherein the corresponding estimated ionosphere delay value is obtained based on a rover pierce point falling within a particular cell of the ionosphere map.

7. The system of claim 1 wherein the one or more estimated ionosphere delay values are received in one or more broadcast messages.

8. A method comprising:
    receiving, at a server having a processor and a memory, one or more estimated ionosphere delay values from at least one rover, wherein each estimated ionosphere delay value is calculated for a corresponding global navigation satellite system (GNSS) satellite in view of the rover, and wherein each of the one or more estimated ionosphere delay values indicates an adverse effect of ionospheric activity on satellite signals transmitted by the corresponding GNSS satellite;
    receiving, at the server, coordinates of one or more pierce points and coordinates of the rover from the at least one rover, wherein the coordinates of each pierce point indicate an intersecting location of the satellite signals transmitted by the corresponding GNSS satellite and the ionosphere; and
    generating, by the processor of the server, an ionosphere map that reflects the ionospheric activity for a geographical location or region, wherein the ionosphere map is generated utilizing the one or more estimated ionosphere delay values, the coordinates of the one or more pierce points received from the at least one rover, and the coordinates of the rover received from the at least one rover.

9. The method of claim 8, further comprising receiving, from the at least one rover, an identifier that uniquely identifies the rover and an identifier that uniquely identifies the corresponding GNSS satellite.

10. The method of claim 9, wherein a table is stored in the memory, wherein an entry of the table is configured to store each of the one or more estimated ionosphere delay values calculated for the corresponding GNSS satellite, the coordinates of the pierce point associated with the corresponding GNSS satellite, the identifier that uniquely identifies the rover, the coordinates of the rover, and the identifier that uniquely identifies the corresponding GNSS satellite, a standard deviation of estimated ionosphere delay values, and a reference time at which the estimated ionosphere delay value was calculated.

11. The method of claim 8, wherein as the one or more estimated ionosphere delay values increase, it is determined that the adverse effect of the ionospheric activity on the satellite signals is getting stronger.

12. The method of claim 8, further comprising transmitting the ionosphere map to one or more rovers, wherein each rover obtains a corresponding estimated ionosphere delay value as a correction for satellite range measurement utilizing the received ionosphere map.

13. The method of claim 12, wherein the corresponding estimated ionosphere delay value is obtained based on a rover pierce point falling within a particular cell of the ionosphere map.

14. The method of claim 8 wherein the one or more estimated ionosphere delay values are received in one or more broadcast messages.

15. A rover, comprising:
a global navigation satellite system (GNSS) receiver including a processor and a memory, the processor configured to:
receive one or more estimated ionosphere delay values where each estimated ionosphere delay value is calculated for a GNSS satellite in view of each of one or more other rovers, and wherein each of the one or more estimated ionosphere delay values indicates an adverse effect of ionospheric activity on satellite signals transmitted by the corresponding GNSS satellite,
select a particular estimated ionosphere delay value of the one or more estimated ionosphere delay values, and
utilize the particular estimated ionosphere delay value as a correction for satellite range measurements obtained from the satellite signals transmitted by the given GNSS satellite or apply the particular estimated ionosphere delay value as a constraint to ionosphere delay estimated as an Extended Kalman Filter (EKF) state.

16. The rover of claim 15 wherein as the one or more estimated ionosphere delay values increase, it is determined that the adverse effect of the ionospheric activity on the satellite signals is getting stronger.

17. The rover of claim 15 wherein the one or more estimated ionosphere delay values are received in one or more broadcast messages in a Peer-to-Peer network.

18. The rover of claim 15, wherein the rover is a single frequency rover, a dual frequency rover, or a multi-frequency rover.

19. The rover of claim 15, wherein the one or more estimated ionosphere delay values are received directly from the one or more other rovers or the one or more estimated ionosphere delay values are received from a central server that receives the one or more estimated ionosphere delay values from the one or more other rovers.

20. The rover of claim 18 wherein the processor is further configured to receive a rover identifier that uniquely identifies the at least one other rover and a GNSS identifier that uniquely identifies the corresponding GNSS satellite.

* * * * *

UNITED STATES PATENT AND TRADEMARK OFFICE
CERTIFICATE OF CORRECTION

PATENT NO. : 10,690,775 B2
APPLICATION NO. : 15/637512
DATED : June 23, 2020
INVENTOR(S) : Altti Samuli Jokinen Page 1 of 1

It is certified that error appears in the above-identified patent and that said Letters Patent is hereby corrected as shown below:

In the Claims

Column 14, Line 7 In Claim 3 reads:
"each of the one of more estimated ionosphere delay values"
Should read:
"each of the one or more estimated ionosphere delay values"

Signed and Sealed this
Twenty-seventh Day of October, 2020

Andrei Iancu
*Director of the United States Patent and Trademark Office*